United States Patent
Van Son

(10) Patent No.: US 9,243,484 B1
(45) Date of Patent: Jan. 26, 2016

(54) OIL FIELD STEAM GENERATION USING UNTREATED WATER

(71) Applicant: Kerry Van Son, Calgary (CA)

(72) Inventor: Kerry Van Son, Calgary (CA)

( * ) Notice: Subject to any disclaimer, the term of this patent is extended or adjusted under 35 U.S.C. 154(b) by 0 days.

(21) Appl. No.: 13/858,180

(22) Filed: Sep. 13, 2013

Related U.S. Application Data

(60) Provisional application No. 61/707,077, filed on Sep. 28, 2012.

(51) Int. Cl.
  *E21B 43/24*  (2006.01)
(52) U.S. Cl.
  CPC ...................................... *E21B 43/24* (2013.01)
(58) Field of Classification Search
  CPC ............................ E21B 43/162; E21B 43/2408
  USPC ....................................................... 166/272.3
  See application file for complete search history.

(56) References Cited

U.S. PATENT DOCUMENTS

| | | | |
|---|---|---|---|
| 2,864,502 A * | 12/1958 | May .............................. | 210/774 |
| 4,513,733 A | 4/1985 | Braun | |
| 6,984,292 B2 * | 1/2006 | Kresnyak et al. ................. | 203/1 |
| 7,591,309 B2 | 9/2009 | Minnich et al. | |
| 7,736,518 B2 * | 6/2010 | Smith et al. .................... | 210/708 |
| 8,469,092 B2 | 6/2013 | Curole et al. | |
| 2011/0005749 A1 * | 1/2011 | Curole et al. .............. | 166/272.3 |
| 2012/0000642 A1 | 1/2012 | Betzer Tsilevich | |
| 2012/0160187 A1 | 6/2012 | Bunio et al. | |

FOREIGN PATENT DOCUMENTS

WO    WO2010091357    8/2010

* cited by examiner

*Primary Examiner* — Catherine Loikith
*Assistant Examiner* — Ashish Varma
(74) *Attorney, Agent, or Firm* — Maxey Law Office, PLLC; Stephen Lewellyn

(57) ABSTRACT

An improved method of steam generation for thermal oil recovery by delivering the produced oil-water emulsion, together with a hot hydrocarbon liquid, to a flash vessel where most of the water is flashed off as steam, which can be used for injection in further thermal oil production; while the liquid phase, containing oil, entrained solids and some water is passed to a separator, where a portion of the oil is removed as sales product, most of the water and solids are removed as waste and the remaining oil and traces of water are recirculated to a heater and a flash vessel to provide heat for further processing. If desired, the produced water-oil emulsion may first be passed through a separator vessel which divides the emulsion into three streams, hydrocarbon liquid, gas and water; with hydrocarbon liquid being sent to a coalescer vessel to produce sales quality oil, the gases sent to a fuel or flare system and the water being treated as described above.

11 Claims, 4 Drawing Sheets

OIL FIELD STEAM GENERATION USING UNTREATED WATER

CROSS-REFERENCE TO RELATED APPLICATIONS

This application is a non-provisional of and claims benefit of U.S. provisional application 61/701,077, entitled "Oilfield Steam Generation Using Untreated Water," filed Sep. 14, 2012.

FIELD OF INVENTION

This invention relates to thermal oil production by steam injection with the steam generated from emulsion, untreated produced water or other saline waters.

BACKGROUND

In traditional heavy oil recovery employing steam injection, the produced water, oil and gas flow together from the wellhead to the process factory. The produced fluids generally form an oil-water emulsion. At the process factory, the traditional process is to separate the gases and oil from the water. The oil is then treated to remove trace amounts of water and other materials to meet the required sales specification. Generally, the oil produced in thermal recovery schemes is high in density and viscosity. Therefore, a diluent, such as condensate, naphtha, light crude oil or synthetic oil is added to the produced oil to reduce the density and viscosity to meet the pipeline specifications. The water that has been separated from the oil requires additional treatment to remove the entrained oil to very low levels to ensure that it does not foul downstream water treatment systems. To produce a water quality suitable to feed drum boilers or Once Through Steam Generators (OTSG's), field process techniques treat the de-oiled water using either a combination of ion exchange and lime softening to remove inorganic solids and reduce water hardness; or an evaporator which boils and subsequently condenses the water to produce a water that is very low in dissolved and suspended inorganic solids. In the former case, the water is suitable as boiler feed water to an OTSG to produce steam for the thermal recovery process. In the latter case, the water purity can be suitable for use in a drum boiler or an OTSG. However, both of these prior art techniques require the steps of water separation and treatment which involve considerable expense, manpower and equipment. Thus, none of the prior art steam generation techniques have been entirely satisfactory.

BRIEF SUMMARY AND OBJECTS OF INVENTION

These disadvantages of the prior art are overcome with the present invention and an improved method of steam generation is provided which eliminates the need for water treatment processes and equipment.

These advantages of the present invention are preferably attained by providing an improved method of steam generation for thermal oil recovery by delivering the produced oil-water emulsion, together with a hot hydrocarbon liquid, to a flash vessel where most of the water is flashed off as steam, which can be used for injection in further thermal oil production; while the liquid phase, containing oil, entrained solids and some water is passed to a separator, where a portion of the oil is removed as sales product, most of the water and solids are removed as waste and the remainder of the oil is recirculated to the flash vessel for further processing. If desired, the produced water-oil emulsion may first be passed through a separator vessel which divides the emulsion into three streams, hydrocarbon liquid, gas and water; with hydrocarbon liquid being sent to a coalescer vessel to produce sales quality oil, the gases sent to a fuel or flare system and the water being treated as described above.

Accordingly, it is an object of the present invention to provide an improved method of thermal oil recovery.

Another object of the present invention is to provide an improved method of thermal oil recovery by steam injection.

An additional object of the present invention is to provide an improved method for generating steam or a steam-light hydrocarbon mixture suitable for thermal recovery.

Another object of the present invention is to provide an improved method for removal of dissolved and suspended solids from a produced oil-water emulsion.

A further object of the present invention is to provide an improved method of thermal oil recovery by steam injection which does not require water treatment or equipment.

An additional object of the present invention is to provide an improved method for generating steam, by using a hot oil circulation loop to provide direct heat to a water stream or a water-oil emulsion to evaporate water.

Another object of the present invention is to provide an improved method for generating steam from produced water or water with high levels of dissolved solids.

A specific object of the present invention is to provide an improved method of steam generation for thermal oil recovery by delivering the produced oil-water emulsion, together with a hot hydrocarbon liquid, to a flash vessel where most of the water is flashed off as steam, which can be used for injection in further thermal oil production; while the liquid phase, containing oil, entrained solids and some water is passed to a separator, where a portion of the oil is removed as sales product, the solids and most of the remaining water is removed as waste and the remainder of the hydrocarbon liquid with potentially a trace of water is recirculated to the flash vessel for further processing. If desired, the produced water-oil emulsion may first be passed through a separator vessel which divides the emulsion into three streams, hydrocarbon liquid, gas and water; with hydrocarbon liquid being sent to a coalescer vessel to produce sales quality oil, the gases sent to a fuel or flare system and the water being treated as described above.

These and other objects and features of the present invention will be apparent from the following detailed description, taken with reference to the figures of the accompanying drawing.

DETAILED DESCRIPTION OF THE INVENTION

Figure 1:
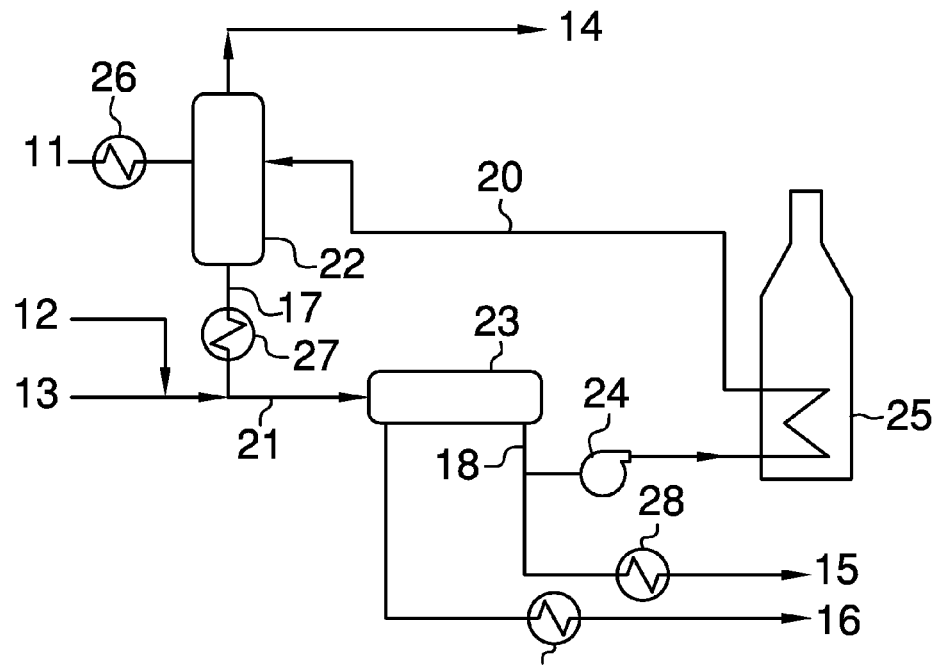
FIG. 1 is a flow diagram showing the method of the present invention.

In that form of the present invention chosen for purposes of illustration in FIG. 1, the feed stream 11 is either a produced oil-water emulsion or a water stream containing dissolved and suspended inorganic solids and organics, such as oil. Stream 11 is pressurized above the pressure required by output stream 14 and is heated in a heat exchanger 26 prior to entering flash vessel 22, where it is directly contacted with hot hydrocarbon liquid stream 20. There is sufficient enthalpy in stream 20 to heat feed stream 11 to the water flash temperature and to vaporize all or nearly all of the water in stream 11 to steam. If there are any volatile hydrocarbons in stream 11 or 20, they may also be flashed and exit the flash vessel 22 with the steam in stream 14. The steam and any hydrocarbon vapor in stream 14 are of suitable quality and pressure to allow direct injection into thermal recovery wells.

The dissolved and suspended inorganic solids contained in the feed stream 11 do not vaporize, but remain entrained in the liquids in flash vessel 22, along with the majority of the hydrocarbons from streams 11 and 20, and exit the bottom of flash vessel 22 as stream 17. Stream 17 is cooled in heat exchanger 27, mixed with makeup water stream 12 and makeup hydrocarbon diluent stream 13. The streams 17, 12 and 13 are combined to form stream 21 which is fed to separator 23. The cooling completed by heat exchanger 27, as well as the mixing of makeup streams 12 and 13 serve to obtain optimum conditions for the oil-water-solid separation to take place in separator 23. In separator 23, the water and solids are removed as stream 16 and are cooled in heat exchanger 29 prior to going to waste disposal. The hydrocarbons are removed from separator 23 as stream 18, with the majority being fed to pump 24 which increases the pressure of stream 18 to deliver it through fired heater 25. The streams 17, 18, 20 and 21 and equipment 22, 23, 24 and 25 form a hot oil circulation loop that provides direct heat to stream 11 to vaporize the water to high pressure steam. If the feed stream 11 was primarily a water stream, only a small amount of hydrocarbons will be removed as stream 15; however, if the feed stream 11 is a produced oil-water emulsion, stream 15 will be the sales product oil, meeting the required specifications for density, viscosity and Basic Sediments and Water (BS&W). Control of density and viscosity is completed through the makeup stream 13, which will consist of a hydrocarbon diluent to reduce both the density and viscosity of the produced oil. Stream 15 is cooled by heat exchanger 28.

The hydrocarbons exiting pump 24 enter fired heater 25 where sufficient enthalpy is added to heat stream 11 to the boiling point and to vaporize the water to steam, while the hydrocarbon liquids exit fired heater 25 through stream 20. The temperature and flow rate of stream 20 will be dictated by the energy required to heat stream 11 to the boiling point, and vaporize the majority of the water contained therein.

Figure 2:
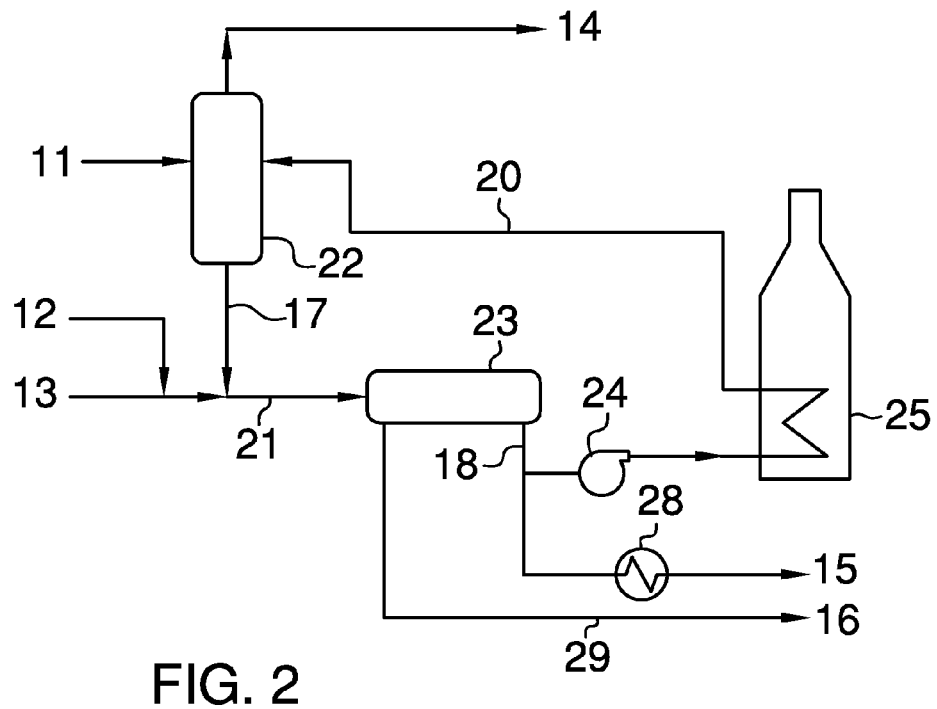
FIG. 2 is a flow diagram of a modified form of the method of FIG. 1 with the elimination of the heat exchangers upstream and downstream of the flash vessel.

The potential for cross exchange exists in heat exchangers 26, 27, 28 and 29. For example, heat exchanger 26 is heating stream 11, while heat exchanger 27 is cooling stream 17. However, heat exchangers 26 and 27 could be combined into a single heat exchanger with stream 11 being heated on one side, while stream 17 is being cooled on the other side. There may be instances where it is of no advantage to cool stream 17 in heat exchanger 27 and/or heat stream 11 in heat exchanger 26. This embodiment is shown in FIG. 2 where feed stream 11 enters the flash vessel 22 without pre-heating and liquid stream 17 is not cooled prior to mixing with streams 12 and 13 and entering separator 23. Hence, heat exchangers 26 and 27 are eliminated. This embodiment can also be applied to the processes described in FIGS. 3 and 4.

Figure 3:
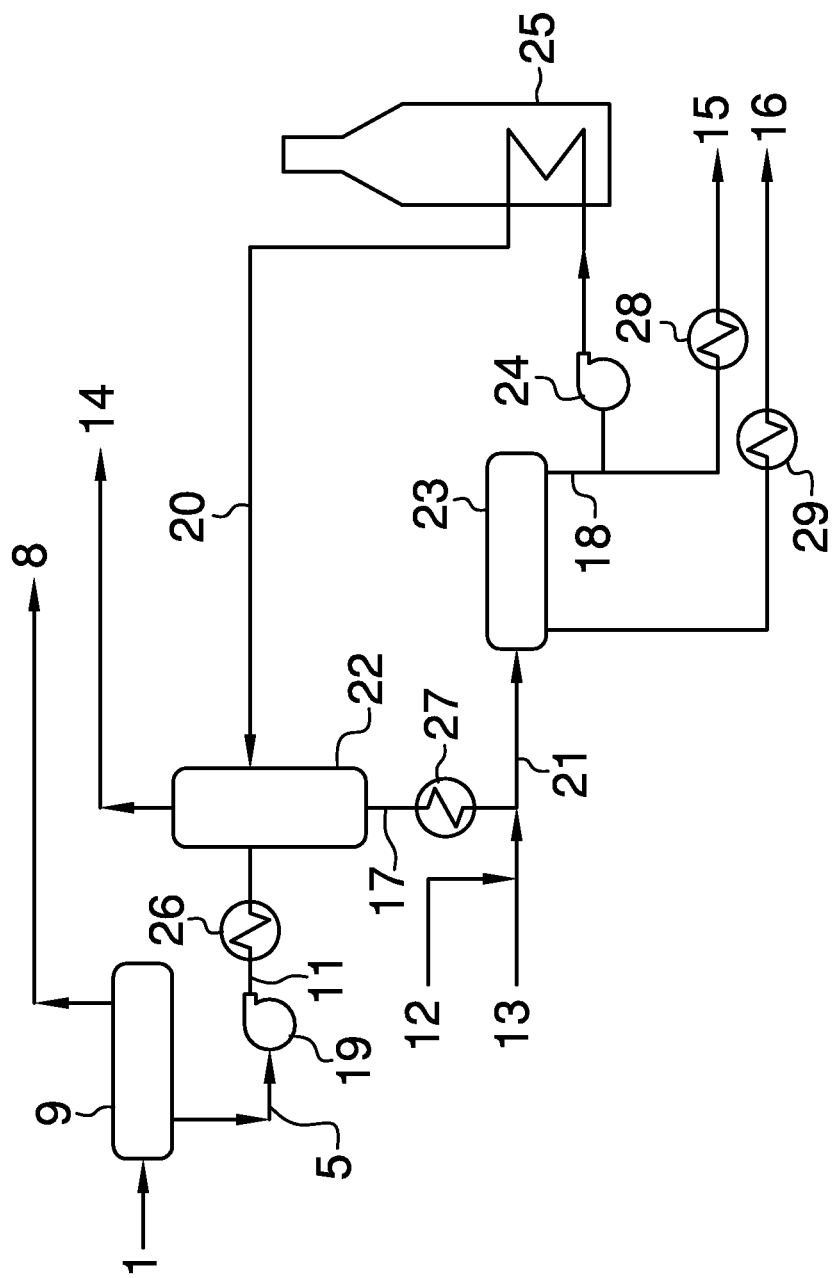
FIG. 3 is a flow diagram of an additional modified form of the method of FIG. 1 with the process configured to accept the oil-water emulsion as feed to the flash vessel.

FIG. 3 shows the embodiment where the feed stream 1 is a produced oil-water emulsion which is routed to a degassing vessel 9 where gases are removed as stream 8. The de-gassed oil-water emulsion stream 5 is pressurized by pump 19 to a pressure exceeding that required for stream 14 and exits pump 19 as feed stream 11, which is fed through heat exchanger 26 to the flash vessel 22. In the flash vessel 22, the feed stream 11 is contacted by the hot hydrocarbon liquid stream 20, which may also contain a hydrocarbon diluent. Stream 20 contains sufficient enthalpy to vaporize most or all of the water in feed stream 11, as well as any volatile hydrocarbons entrained in either stream 11 or 20. These vapors exit the flash vessel 22 as stream 14 and are of suitable quality and pressure to permit direct injection in to thermal recovery wells. The entrained inorganic solids in stream 11 together with the hydrocarbon liquids of streams 11 and 20 exit the bottom of flash vessel 22 as stream 17. Stream 17 is cooled in heat exchanger 27, mixed with makeup water stream 12 and makeup hydrocarbon diluent stream 13 to form stream 21 which is fed to separator 23. The cooling obtained in heat exchanger 27 and the mixing of streams 17, 12 and 13 create optimum conditions for the oil-water-solid separation to take place in separator 23. From separator 23, the water and solids are removed as stream 16 and are cooled in heat exchanger 29 before being sent to waste disposal. The hydrocarbon liquids are removed from separator 23 as stream 18 and fed to pump 24 which increases the pressure of stream 18 and passes it to fired heater 25. The hot hydrocarbons exit fired heater 25 as stream 20 and are fed to the flash vessel 22 with sufficient enthalpy to heat feed stream 11 to the boiling point and to vaporize water in stream 11 to steam. Finally, a significant portion of the hydrocarbon liquids are removed from separator 23 as stream 15, which is the sales oil product.

Figure 4:
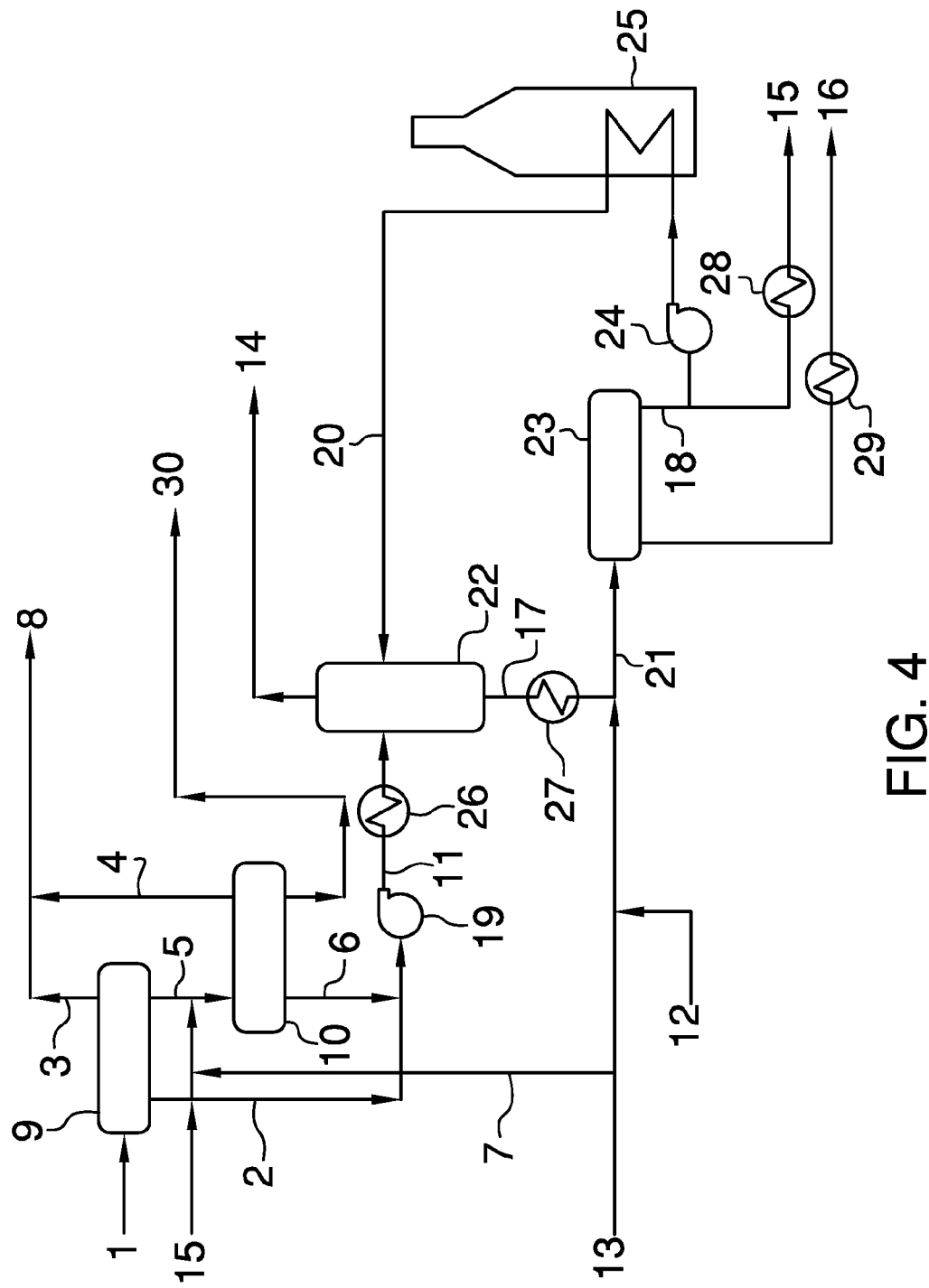
FIG. 4 is a flow diagram of a further modified form of the method of FIG. 1 with a Free Water Knockout vessel at the front end of the process to separate oil from water and to send the water to the flash vessel.

FIG. 4 shows an embodiment in which the produced gas-oil-water emulsion of feed stream 1 is first routed to a degassing/Free Water Knockout vessel 9, where the gases are removed as stream 3, liquid water is removed as stream 2 and the hydrocarbon liquids are removed as stream 5. Hydrocarbon diluent may be added to the feed stream 5 to improve separation in vessel 9. Hydrocarbon diluent, from streams 7 and 15, are mixed with stream 5 prior to entering the coalescer vessel 10, where any residual gases are removed as stream 4, which is combined with stream 3 to form stream 8 and is sent to the fuel or flare system. Also, in coalescer vessel 10, the final traces of water are removed as stream 6 and sales quality hydrocarbon liquid is removed as stream 30. Control of density and viscosity in the produced oil is controlled by adding hydrocarbon diluent through makeup stream 7.

The water stream 6 is mixed with stream 2 and is pressurized by pump 19 to a pressure exceeding the required pressure of stream 14. Water streams 2 and 6 may contain small amounts of produced oil. Stream 11 exits the pump 19 and is heated in heat exchanger 26 prior to entering the flash vessel 22, where it is directly contacted by hot hydrocarbon liquid stream 20. There is sufficient enthalpy in stream 20 to vaporize all of the water in stream 11 to steam and to vaporize any volatile hydrocarbons in the streams 11 or 20 to the flash temperature, so that they exit the flash vessel 22 with the steam in stream 14. The steam and any hydrocarbon vapor in stream 14 are of suitable quality and pressure to enable direct injection into thermal recovery wells.

The inorganic solids entrained in stream 11 do not vaporize, but may precipitate and remain with the hydrocarbon liquids and exit the bottom of the flash vessel 22 as stream 17. Stream 17 is cooled in heat exchanger 27, mixed with makeup water stream 12 and makeup hydrocarbon diluent stream 13. Streams 12, 13 and 17 combine to form stream 21 which is fed to separator 23. The cooling achieved by heat exchanger 27 and the mixing of streams 12, 13 and 17 serves to obtain optimum conditions for the oil-water-solid separation which takes place in separator 23. In separator 23, the water and solids are removed as stream 16, which is cooled in heat exchanger 29 prior to going to waste disposal. The hydrocarbon liquids are removed from separator 23 as stream 18, with the majority of the hydrocarbon liquids being fed to pump 24 which increases the pressure of stream 18 to pass it through fired heater 25. Stream 15 is a hydrocarbon purge line designed to eliminate any hydrocarbon liquids from accumulating in the heating loop and routing them back to the coalescer vessel 10.

The hydrocarbons exiting pump 24 enter fired heater 25 and exit as stream 20. In fired heater 25, sufficient enthalpy is added to stream 20 to heat stream 11 to the boiling point and to vaporize the water in stream 11 to steam. Fired heater 25 could be replaced by an indirect heat exchanger. The temperature required in stream 20 will be dictated by the energy required to heat stream 11 to the boiling point of water and vaporize the majority of the water at the required pressure for stream 14. In this embodiment, stream 20 could be the hydrocarbon diluent or a commercial hydrocarbon heat transfer fluid.

Figure 5:
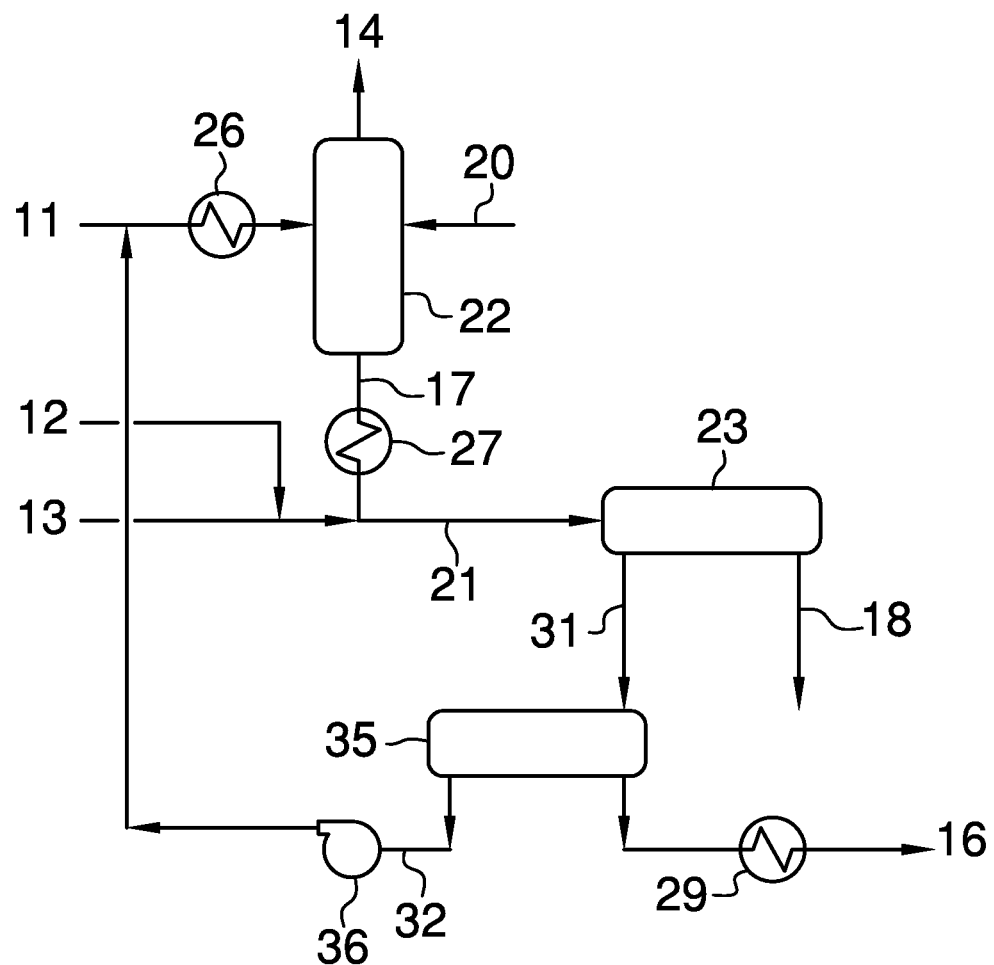
FIG. 5 is a flow diagram of a modified form of the method of FIG. 1 having a water recycle stream that may be incorporated into any of the foregoing forms of the method.

FIG. 5 shows an embodiment that introduces a water recycle stream to increase the water concentration in the flash vessel 22 and/or separator 23 and, potentially, to reduce the water makeup stream 12. As shown, stream 31 contains the water and entrained solids from separator 23. Stream 31 enters separator 35, where a portion of the water and dissolved solids, together with a majority of the suspended solids exit the separator 31 as stream 16 and are routed to disposal. The remainder of the water and dissolved solids exit the separator 31 as stream 32 and are passed through pump 36 and combined with stream 11 to feed heat exchanger 26 and flash vessel 22. Alternatively, or in addition to being added to stream 11, stream 32 could be pumped by pump 36 and combined with stream 21 to feed separator 23.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. An improved method of steam injection for thermal oil recovery comprising:
    delivering a feed stream containing water to a flash vessel;
    delivering a hot hydrocarbon liquid stream to said flash vessel separately from said feed stream;
    directly contacting said feed stream and said hot hydrocarbon liquid stream in said flash vessel causing most of said water from said feed stream to flash off as steam and causing said feed stream and said hot hydrocarbon liquid stream to join together as a liquid phase containing oil, entrained solids, and water;
    removing said steam from said flash vessel as a stream feed that is suitable for injection in further thermal oil production; and
    removing said liquid phase from said flash vessel as a liquid stream;
    passing said liquid stream to a separator vessel causing said liquid stream to separate into a sales oil stream, a waste water stream, and an oil stream.

2. The method of claim 1 further comprising:
    circulating said oil stream through a heater and then returning said oil stream to the flash vessel as said hot hydrocarbon liquid stream.

3. The method of claim 1, wherein said feed stream is a produced oil-water emulsion.

4. The method of claim 1, wherein said feed stream is a water stream containing dissolved and suspended inorganic solids and organics.

5. The method of claim 1, wherein said feed stream is heated prior to entry into said flash vessel; and said liquid stream is cooled prior to entry into said separator.

6. The method of claim 5, wherein said heating and said cooling occur on opposite sides of a common heat exchanger.

7. The method of claim 1, further comprising:
    passing a produced water-oil emulsion through a second separator vessel which divides said produced water-oil emulsion into three streams, a hydro-carbon liquid stream, a gas stream and said feed stream;
    sending said hydro-carbon liquid stream to a coalesser vessel to produce sales quality oil; and
    sending said gas stream to a fuel or flare system.

8. The method of claim 1, further comprising:
    degassing said feed stream before the step of delivering said feed stream to said flash vessel.

9. The method of claim 1, further comprising:
    passing said feed stream through a degassing/Free Water Knockout vessel before the step of delivering said feed stream to said flash vessel.

10. The method of claim 1, further comprising:
    adding a water recycle stream to increase the water concentration in said flash vessel.

11. The method of claim 1, further comprising:
    adding a water recycle stream to increase the water concentration in said separator vessel.

* * * * *